United States Patent [19]

Little

[11] 4,269,612
[45] May 26, 1981

[54] EXHAUST GAS CLEANING SYSTEM

[76] Inventor: Joseph E. Little, Rte. 1, Hwy. 62, Pollard, Ark. 72456

[21] Appl. No.: 110,808

[22] Filed: Jan. 10, 1980

[51] Int. Cl.³ .................................................. B01D 47/02
[52] U.S. Cl. ....................................... 55/227; 55/245; 55/248; 55/274; 55/DIG. 30; 261/119 R; 261/125; 261/DIG. 9
[58] Field of Search ................. 55/219, 227, 245, 248, 55/274, DIG. 30; 261/119 R, 125, 126, DIG. 9; 110/215; 60/310

[56] References Cited

U.S. PATENT DOCUMENTS

| | | | |
|---|---|---|---|
| 946,146 | 1/1910 | Merrick | 261/DIG. 9 |
| 1,791,814 | 2/1931 | Hillery | 55/274 |
| 2,787,454 | 4/1957 | Coppola | 261/DIG. 9 |
| 3,132,192 | 5/1964 | Lessmann | 261/119 R |
| 3,242,941 | 3/1966 | Palmore | 55/227 |
| 3,642,259 | 2/1972 | Bowden | 55/DIG. 30 |
| 3,733,787 | 5/1973 | Winningham | 55/227 |
| 3,815,332 | 6/1974 | Bobrowsky et al. | 55/227 |

FOREIGN PATENT DOCUMENTS

| | | | |
|---|---|---|---|
| 136090 | 8/1933 | Austria | 261/119 R |
| 368401 | 11/1906 | France | 261/119 R |
| 630583 | 12/1927 | France | 55/227 |

Primary Examiner—David L. Lacey
Attorney, Agent, or Firm—Stephen D. Carver

[57] ABSTRACT

An exhaust gas cleaning system adapted to clean smoke or other waste gases through a liquid bath process. This system comprises a generally cubicle enclosure divided internally into three separate compartments. The first compartment includes means for inputting both a cleaning solution, preferably water, and a dirty exhaust gas for cleaning. Liquid level is maintained relatively constant by a float-actuated door system. A barrier disposed within the compartment prevents liquid turbulance. An adjacent intermediate compartment is in fluid flow communication with the inlet compartment via a submerged liquid passageway through which gases may be drawn by suction. Perforated plate means disposed within the intermediate compartment removes particulate matter from the liquid cleaning solution, and the resulting sediment is deposited in an adjacent auger equipped sediment pit for removal from the system. A third compartment is dividably defined from the intermediate compartment by a wall extending internally of the system above the water level. Exhaust means associated with this compartment draws gases through the system for cleaning. Gravitational forces remove the final particulate matter from the gas for output via a drain orifice.

4 Claims, 4 Drawing Figures

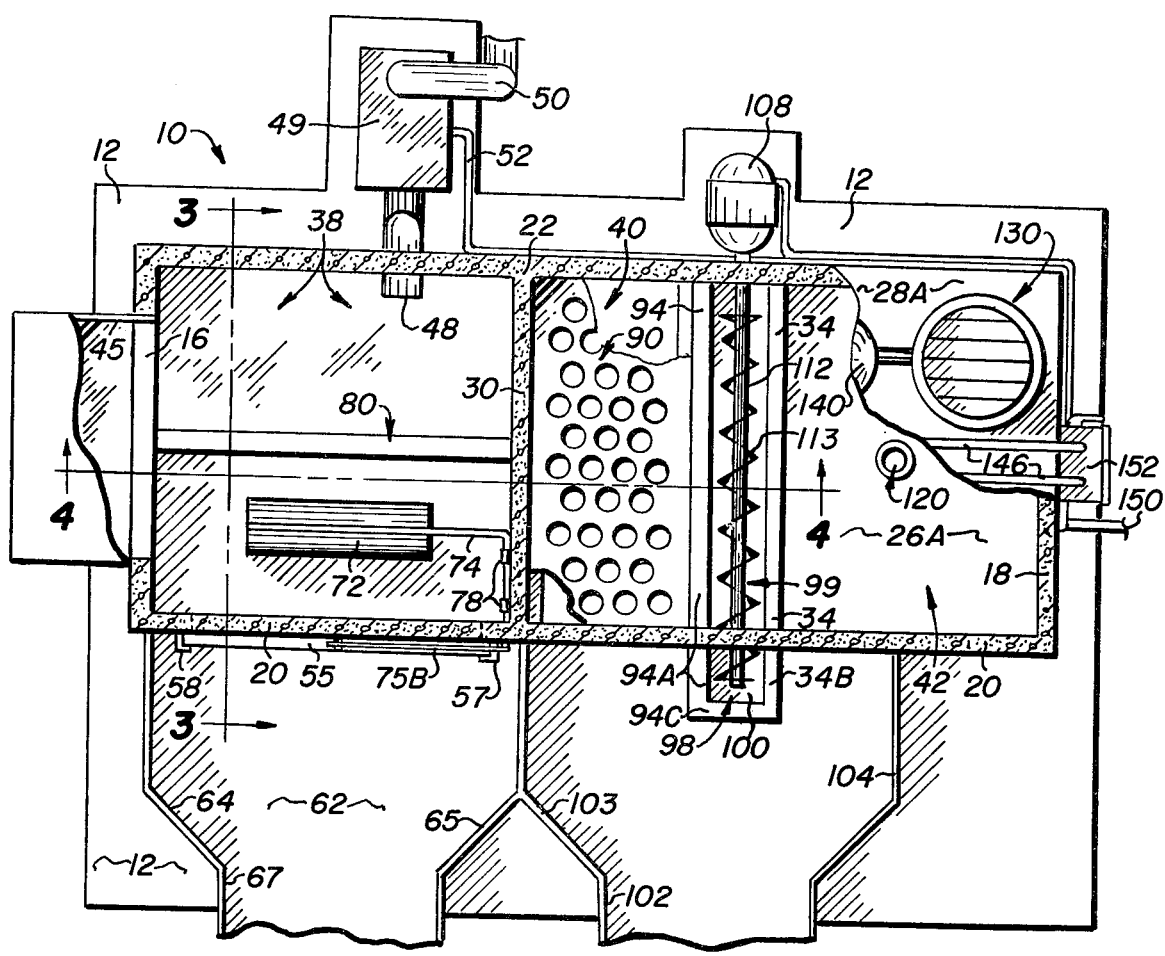
FIG. 2
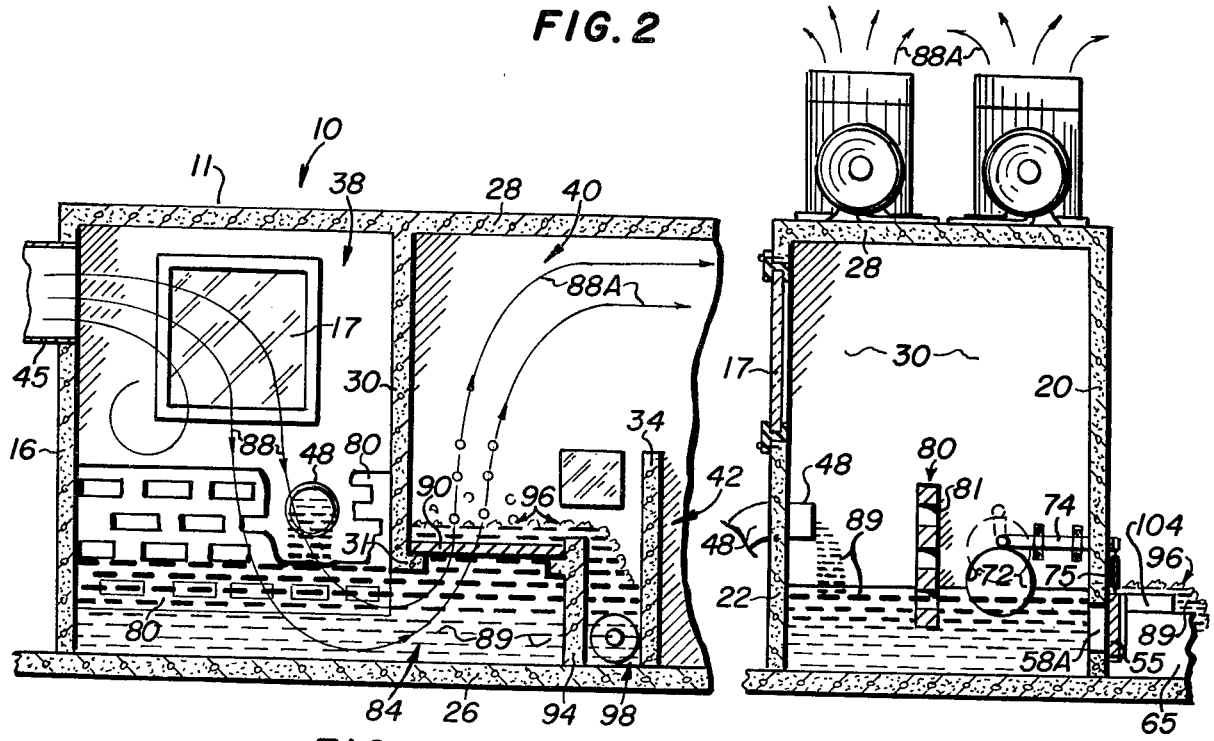
FIG. 4
FIG. 3

EXHAUST GAS CLEANING SYSTEM

BACKGROUND OF THE INVENTION

This invention relates to exhaust gas cleaning systems. More particularly, the present invention relates to gas cleaning systems wherein particulate pollution is removed from air (or other gases) through a process of liquid immersion.

In the prior art a wide variety of approaches have been developed for cleaning air or other gases exhausted from various manufacturing processes. Usually some form of enclosed structure is provided wherein gases may be inputted and drawn through a liquid medium for cleansing. Particulate matter or other pollution is absorbed in the water or cleaning solution. A basic example of the latter technology is shown in the U.S. Pat. No. 2,787,454, issued to J. Coppola on Apr. 2, 1957. Other variations of the water bath gas cleansing process, including the use of compartmentalized structures, is shown in the following U.S. Pat. Nos. 2,399,871; 1,964,794; 3,904,376; 3,733,783; 4,017,280; 4,144,864; 3,414,248; 3,797,204; 3,504,481; 3,756,171; 1,939,949; 3,766,716; 3,315,443; 1,594,324; and 3,785,126.

As will be appreciated by those skilled in the art, the necessity for cleaning air which is to be exhausted to the environment is mandated by a variety of both state and federal laws. Accordingly, the prior art is replete with various structure adapted to utilize the water bath process for gas cleansing. However, most of the prior art systems are of extremely complex and bulky design and usually require several moving parts which tend to be unreliable. Large scale industrial processes adapted for cleaning gases outputted from specialized applications must of necessity incorporate a extremely complicated technology. Because of the prohibitive costs associated with such systems many prior art devices are simply beyond the financial reach of small scale corporations.

It will also be appreciated by those skilled in the art that variations may be encountered in practice in the volume of gas which must be cleansed in an industrial process. Small volumes of gas which must be cleansed of simple particulate matter are easier to properly handle than large volumes of gas contaminated with dangerous hydro carbon solvents, for example. It is my intention to provide a device adapted for both of the aforementioned applications.

SUMMARY OF THE INVENTION

The present invention comprises a compartmentalized exhaust gas cleaning system utilizing the liquid bath method. Preferably a generally cubicle enclosure is divided internally into three separate compartments. The first compartment receives incoming dirty exhaust gases to be cleaned and a cleaning solution, preferably water. Liquid level within the first compartment is regulated by the combination of a barrier system, which reduces turbulence, and a float which opens an exhaust door to drain excess liquid.

An intermediate compartment adjacent to the first compartment is in fluid flow communication therewith through a submerged liquid path which adjoins the common bottoms of the two compartments. A gas recovery compartment abuts the intermediate compartment, and communicates with exhaust fans for creating a partial vacuum to draw gases through the system. Gases entering the intermediate compartment and rising toward the liquid surface contact a perforated baffle located at a height substantially equal to the liquid level. This helps facilitate separation of particulate and other sediment from the water, which sediment drops into an auger-equipped sediment pit for output from the system. As gases rise upwardly into the third compartment, remaining particulate matter may be deposited on the bottom of the third compartment by gravitational forces. The vapor and other liquid which falls into the third compartment will wash remaining particulate matter out of the system through a drain provided for this purpose.

Thus an object of this invention is to provide a unitary gas cleansing system based upon the liquid bath immersion principle.

Another object of this invention is to provide an integral unit in which the various stages of the system are divided into cooperating, compartmentalized subsystems or chambers.

Yet another object of this invention is to provide an inexpensive reliable system for cleaning relatively large volumes of gases polluted with particulate matter.

A still further object of this invention is to provide a water bath gas cleansing system of the character described ideally adapted for use with furnaces such as steel furnaces, standing internal combustion engines and the like.

Another object of this invention is to provide a unitary gas cleansing system of the character described characterized by extreme reliability. It is a feature of this invention that due to the compartmentalized construction a minimum of moving parts are employed.

Another object of this invention is to provide a gas cleansing system of the character described which is adaptable for use with a wide variety of relatively smaller scale industrial applications.

These and other objects and advantages of this invention, along with features of novelty appurtenant thereto, will appear or become apparent in the course in the following description.

BRIEF DESCRIPTION OF THE DRAWINGS

In the following drawings, which form a part of the specification and which are to be construed in conjunction therewith, and in which like reference numerals have been employed throughout to indicate like parts in the various views:

FIG. 2 is a plan view of the invention with parts thereof broken away or shown in section for clarity;

FIG. 3 is a sectional view taken generally along line 3—3 of FIG. 2, and with parts thereof broken away for clarity; and FIG. 4 is a sectional view taken generally along line 4—4 of FIG. 2, with parts thereof broken away for clarity.

DETAILED DESCRIPTION OF THE DRAWINGS

Figure 1:
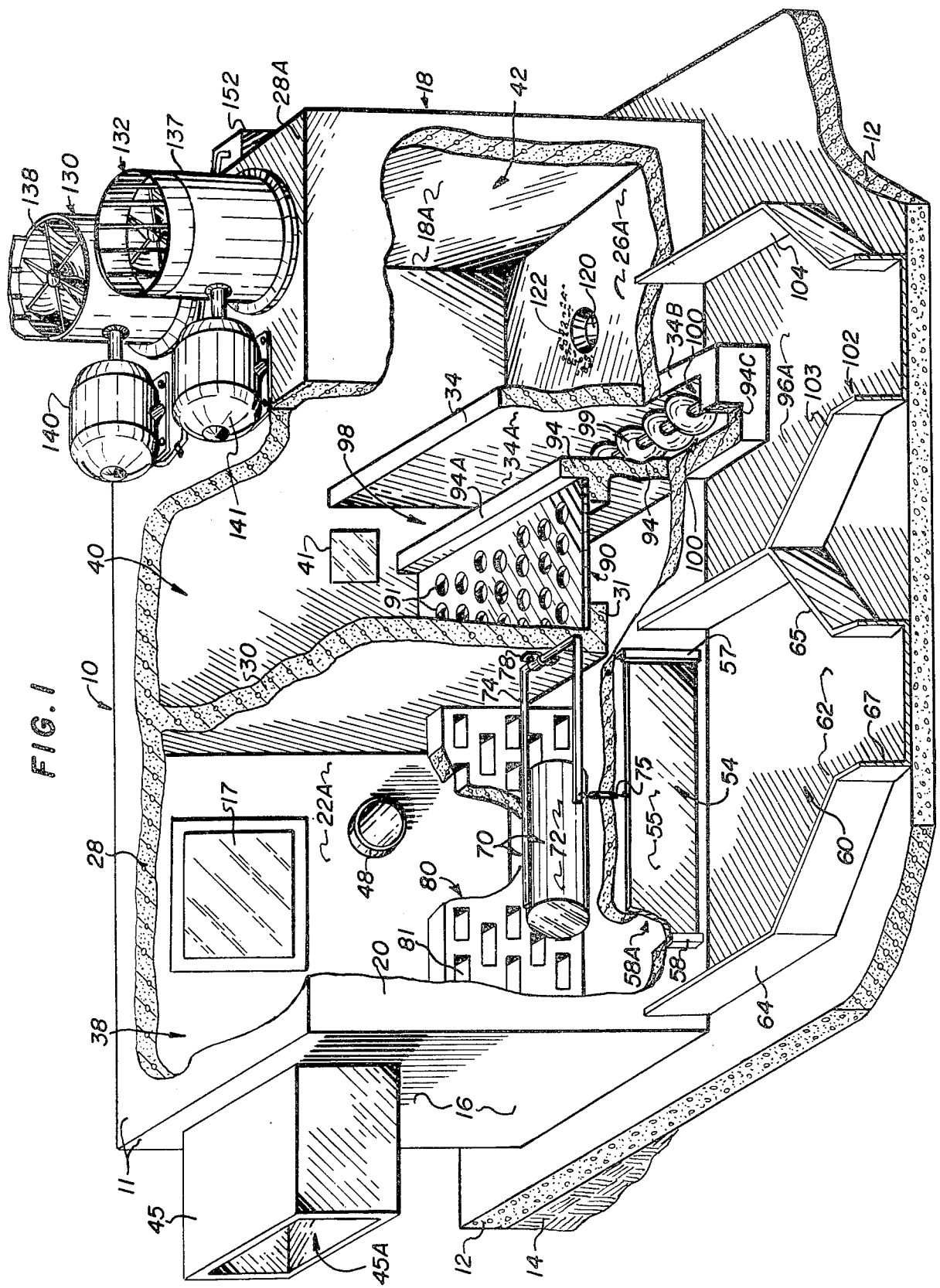
FIG. 1 is a combined isometric and pictorial view of the invention with parts thereof broken away or shown in section for clarity.

With reference new to the appended drawings, the instant exhaust gas cleaning system, generally indicated by the reference numeral 10, is preferably of generally cubicle dimensions, and is adapted to be disposed upon a preferably concrete supporting surface 12, which may be formed upon ground surface 14.

The unit 10 comprises a pair of planar, parallel spaced-a-part end walls 16, 18 and a pair of intersecting front and rear walls 20, 22. It will be apparent that all of the aforementioned walls intersect and are of preferably integral, concrete construction. Each wall extends upwardly from the bottom 26 to the top 28 of the enclosure 11. A first rigid, dividing internal dividing wall 30 extends from top 28 vertically downwardly within the enclosure 11, terminating in a shelf portion 31 spaced apart from bottom 26. A generally parallel second internal dividing wall 34, also of concrete construction, extends vertically upwardly from bottom 26 terminating in a position substantially beneath top 28.

It will thus be apparent that three substantially different compartments 38, 40, and 42 are defined within enclosure 11. Input compartment 38 is adapted to receive dirty gases through an input duct 45 of generally rectangular dimensions which penetrates wall 16. A washing solution, preferably water, is inputted to the input compartment 38 through liquid inlet conduit 48. It will be apparent that gas inlet means 45 is oriented substantially perpendicular to inlet conduit 48. In operation, water will thus substantially fill the enclosure compartment 38, being directed into the compartment at a predetermined velocity via a conventional pump 49 interconnected with a source 50 of water. Pump 49 will be actuated through conventional electrical conduit means 52 of conventional construction. A window 17 provided in rear wall 22 permits inspection of the interior of compartment 38.

The liquid level within compartment 38 is regulated by an output door system 54 comprising a generally planar, rectangular door 55 slideably disposed between a pair of spaced-apart, rigid channels 57, 58 projecting from the outer surface of wall 20. As door 55 is raised water may exit through the orifice 58 A thereby exposed, falling into a trough 60 formed for this purpose. Trough 60 includes a planar surface 62 surrounded by vertical guide walls 64, 65 which converge in an output shoot 67. The dirty cleaning solution or washing solution exiting from shoot 67 may be passed through a filter (not shown) and returned to the inlet conduit 48 into the cleaning compartment 38, or otherwise returned to the environment.

A float system 70 is utilized to control the door system 54 to regulate liquid level. Float system 70 comprises a preferably massive and elongated cylindrical float 72 which is coupled via linkage 74 to door 55 via link 75. It will be apparent that the U-shaped linkage 74 is loosely, hingably coupled to wall 30 via hinge structure 78. Since float 72 will rise in accordance with liquid level within compartment 38, a corresponding rise in door system 54 will occur, outputting water through shoot 67 to regulate internal water level. However, because of the mass of the float 72 and the loose coupling 78, reduction in water level will immediately result in shutting of door 55.

To aid in water level regulation a barrier system 80 is disposed vertically within compartment 38, extending from the floor 26 vertically upwardly between inlet conduit 48 and the float system 70. The barrier system 80 preferably is of brick construction and includes a plurality of passageways or orifices 81 for slowly passing water toward the float system 70. In this manner turbulence induced from water rushing through conduit 48 will be substantially reduced and the float system 70 will function to substantially maintain correct water level. As will be appreciated from FIG. 2, since door 55 is located outside of wall 20, ease of maintainance of the door will be facilitated.

Intermediate compartment 40 is defined between internal walls 30 and 34. As best viewed in FIG. 4, fluid flow communication between compartments 38 and 40 is facilitated by a submerged liquid pathway 84 defined between bottom 26 and shelf portion 31 of first inner wall 30. Thus liquid rising within compartment 38 is immediately transmitted into compartment 40. The liquid level within compartment 40 will be substantially higher than the level with compartment 38 due to pressure differences. Thus, in operation dirty gases 86 entering compartment 38 will be drawn into the cleaning solution or liquid 89 disposed within the system, passing through passageway 84 and out within compartment 40. Substantially "clean" gases 88A will pass into cleansed gas recovery compartment 42, as will be described in detail later.

As best viewed in FIGS. 1 and 4, a perforated plate system 90 is disposed within compartment 40 at a level substantially level with the liquid therewithin. Plate 90 is of perforated construction including a plurality of orifices 91 through which water and gases 88A will pass. The plate 90 is suspended on one side by shelf 31, and by internal support wall 94 extending vertically from floor 26 in parallel, spaced apart relationship with respect to second internal wall 34. In operation plate 90 will tend to separate particulates and floating effluent and facilitate the escape of gases 88A. To this effect, it will be observed that effluent 96 will fall over the uppermost edge portion 94A of wall 94 into a sediment pit 98 disposed within compartment 40. As sediment or waste 96 collects with the sediment pit 98, it will be conveyed forwardly by an auger 99 and out through an orifice 100, where it will be dumped into a sediment shoot 102. Thus sediment outputted from the enclosure 11 will be confined within shoot 102 formed by converging walls 103, 104. This material may be disposed of through a variety of known processes.

Auger 99 is powered by a conventional electric motor 108 disposed rearwardly and outside of the enclosure 11. Auger shaft 112 supports conventional flighting 113 which is spirally wound about it and conventionally attached by welding or the like. Importantly, shaft 112 is loosely coupled through walls 20, 22 to provide a dependable bearing.

Thus in operation, as substantially cleansed gas 88A is drawn through the perforated plate 90, it will pass over second inner wall 34 and enter the cleansed gas recovery compartment 42. Simultaneously sludge 96 will collect near the plate 90 and fall into the sediment pit 98 for removal via auger 99. Gas recovery compartment 42 includes a lower drain orifice 120 through which residue or sediment 122 may pass. As the somewhat cleansed gas 88A is drawn upwardly through compartment 40 over wall 34 and enters compartment 42, certain liquids and particulate residues and waste materials will fall through the force of gravity onto floor 26A within compartment 42. Liquids and waste 122 will be outputted from the enclosure 11 through drain 120.

Gas flow is insured through by a pair of fan assemblies 130, 132 of conventional construction. Both fan assemblies include housings 137 of substantially cylindrical dimensions, and internal blades 138. Each of the fans are driven by electric motors 140, 141 of conventional construction. As best viewed in FIG. 1, the exhaust fan system is preferably located on the roof 28A of the enclosure 11. Pressure first experienced by compartment 42 in response to operation of the fans 130, 132 in responsible for the differential liquid level indicated best in FIG. 4. In this fashion gases will be drawn through the system and substantially purified or cleansed by contact with the cleansing solution 89. The motors will be powered by conduit 146 leading to conventional source of electricity through a line 150.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A compartmentalized exhaust gas cleaning system adapted to be disposed upon a supporting surface, said system comprising:
   a generally cubicle, rigid enclosure comprising a top wall, a bottom wall, a rear wall, a front wall and first and second spaced-apart end walls;
   a first divider wall disposed within said enclosure in spaced-apart, generally parallel relation with respect to said end walls and extending downwardly from said top wall and terminating short of said bottom wall;
   a second divider wall disposed within said enclosure between said first divider wall and said second end wall, said second divider wall extending vertically upwardly from said bottom wall and terminating short of said top wall;
   an input compartment defined interiorly of said enclosure between said first end wall and said first divider wall, said imput compartment comprising:
      liquid inlet means adapted to be connected to an external source of washing solution for admitting solution into said input compartment;
      output door means for draining washing solution from said input compartment whereby to control liquid level;
      float means coupled to said door means and disposed within said input compartment for operating said door means in response to the liquid level in said input compartment;
      apertured, vertically upright barrier means disposed within said input compartment between said liquid inlet means and said float means for reducing liquid turbulence; and,
      gas inlet means for admitting dirty gases to be cleaned into said input compartment;
   an intermediate gas separation compartment defined interiorly of said enclosure adjacent said input compartment and between said first and second divider walls, said intermediate compartment including perforated plate means disposed substantially horizontally within said intermediate compartment for facilitating separation of particulate pollution and gases from liquid contacting said plate;
   a liquid pathway between said first divider wall and said bottom for establishing fluid flow between said input compartment and said intermediate compartment;
   a cleansed gas recovery compartment in fluid flow communication with said intermediate compartment and defined interiorly of said enclosure between said second divider wall and said second end wall, said recovery compartment including drain means provided in the floor of said enclosure for outputting wastes separated from escaping gases exteriorly of said enclosure; and
   exhaust fan means connected to said cleansed gas compartment for drawing gases to be cleansed into and through said enclosure and through said washing solution to effectuate cleaning and for exhausting cleansed gases exteriorly of said system enclosure.

2. The system as defined in claim 1 including a sediment pit disposed within said intermediate compartment adjacent said perforated plate means for collecting sediment and waste, said pit including auger means for outputting sediment from said system through an output orifice in said system.

3. The system as defined in 2 wherein said perforated plate means extends between said first divider wall and said sediment pit.

4. The system as defined in claim 3 including window means defined within said system to facilitate system inspection and maintenance.

* * * * *